Figure 3:
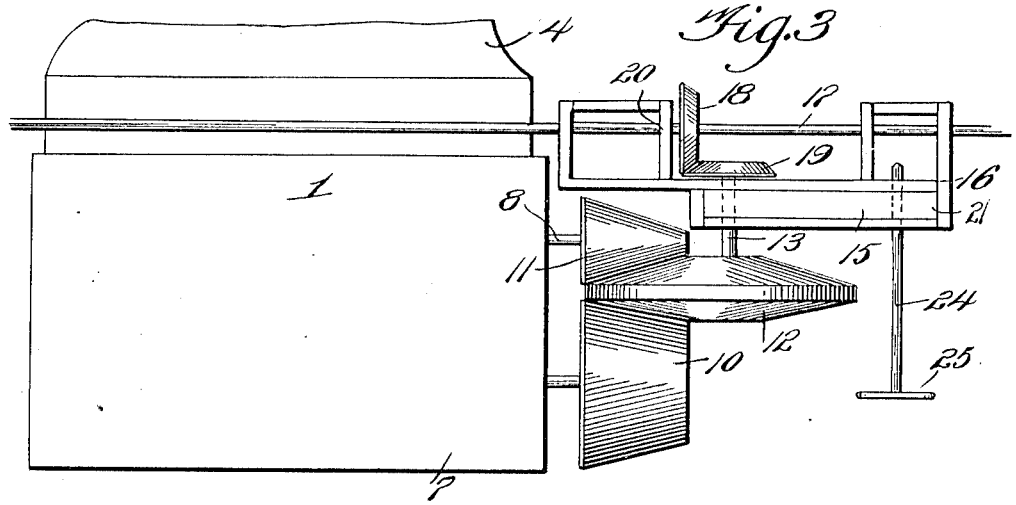

T. R. SMITH.
GEARING.
APPLICATION FILED OCT. 24, 1911.
1,040,799.
Patented Oct. 8, 1912.
4 SHEETS—SHEET 1.
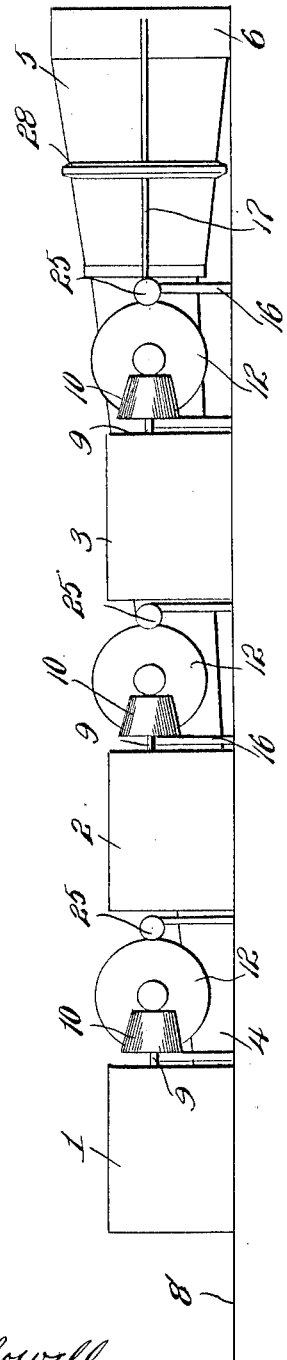
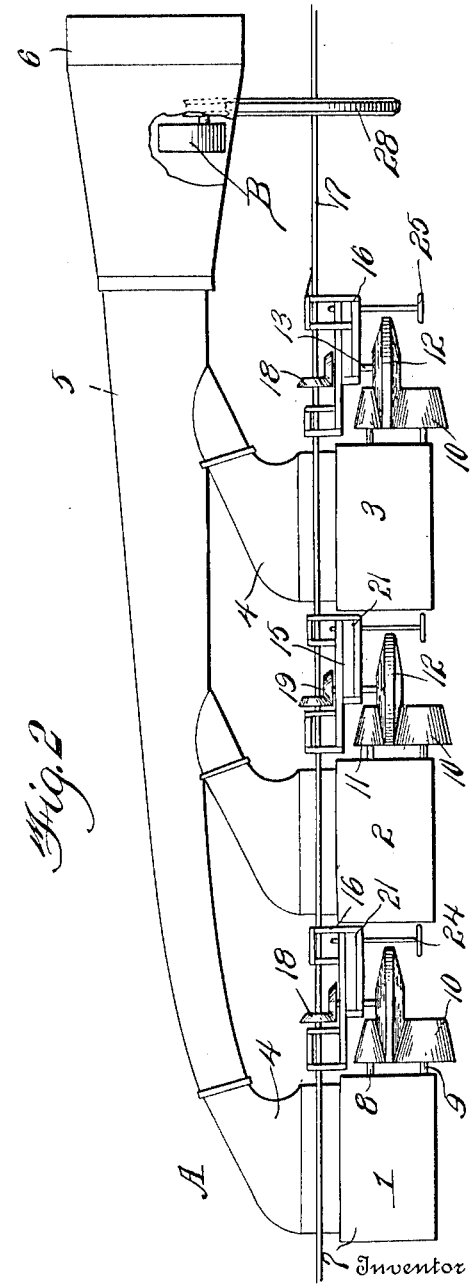
Witnesses
W. S. McDowell
John J. McCarthy
Inventor
Thomas R. Smith.
By Victor J. Evans
Attorney

T. R. SMITH.
GEARING.
APPLICATION FILED OCT. 24, 1911.

1,040,799.

Patented Oct. 8, 1912.

4 SHEETS—SHEET 2.

Witnesses
W. S. McDowell
John J. McCarthy

Inventor
Thomas R. Smith
By Victor J. Evans
Attorney

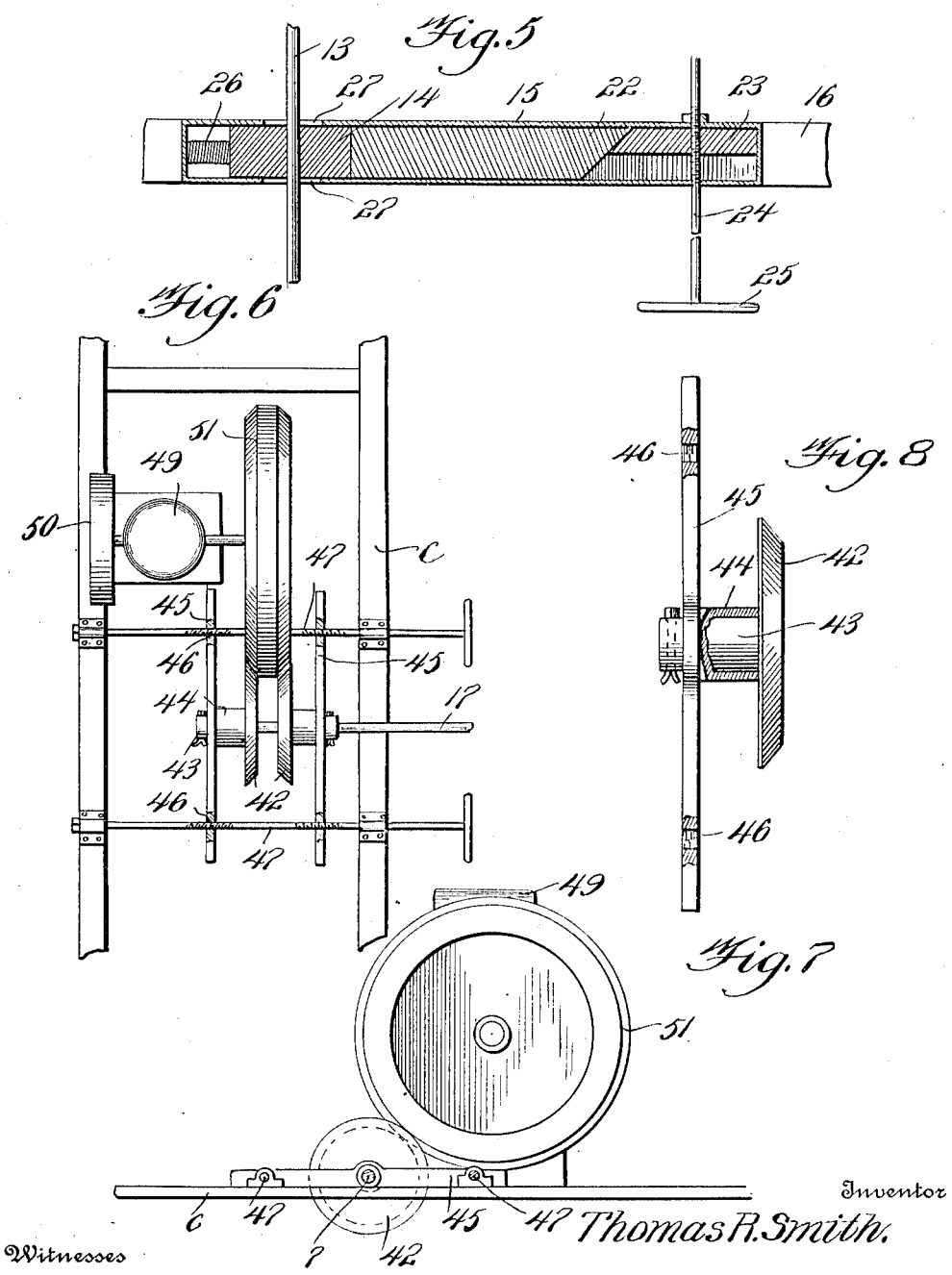

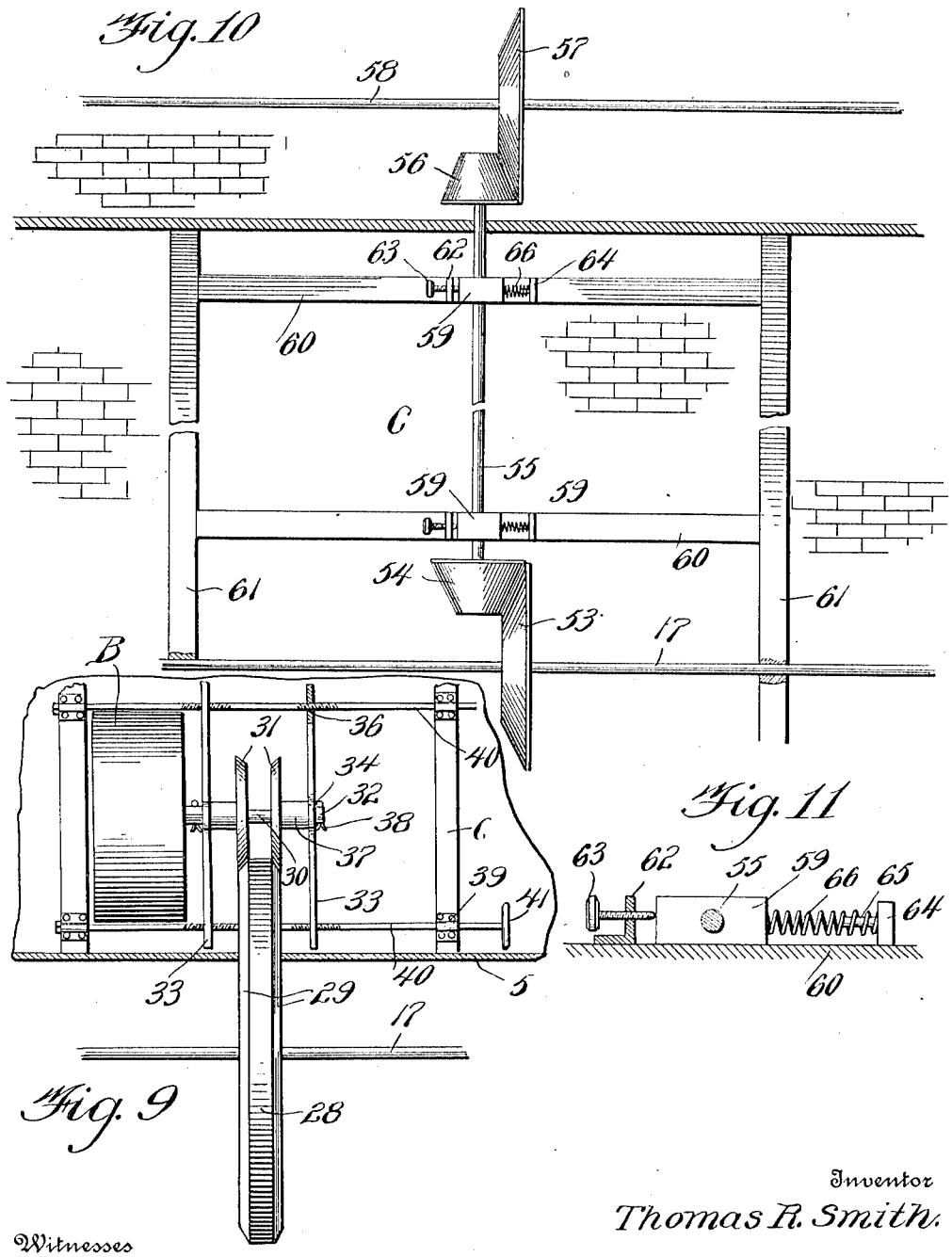

UNITED STATES PATENT OFFICE.

THOMAS R. SMITH, OF DAVIS STATION, SOUTH CAROLINA, ASSIGNOR OF ONE-HALF TO JOSEPH E. DAVIS, OF DAVIS STATION, SOUTH CAROLINA.

GEARING.

1,040,799.  Specification of Letters Patent.  Patented Oct. 8, 1912.

Application filed October 24, 1911. Serial No. 656,382.

*To all whom it may concern:*

Be it known that I, THOMAS R. SMITH, a citizen of the United States of America, residing at Davis Station, in the county of Clarendon and State of South Carolina, have invented new and useful Improvements in Gearing, of which the following is a specification.

The invention contemplates improvements in gearing and relates more particularly to friction gearing.

The invention has particular application to improvements in friction gearing for driving saw gins, although it is not limited to such use, and has for one of its objects to provide a main driving shaft from which the gins are driven, the invention embodying novel means whereby any one of the gins may be disconnected from the drive shaft independently of the remaining gins, or whereby all of the gins may be disconnected from the drive shaft without stopping the operation of the engine.

Another object of my invention is to provide a mechanism of this character whereby a battery of gins or other suitable mechanism may be driven from a main driving shaft without the use of belts, pulleys or the like, thereby dispensing with the inconvenience of repair incident to driving mechanism of this character.

A further object of the present invention is to provide a mechanism of this character whereby a battery of gins or the like may be driven from a main driving shaft, the latter having connections with an engine or other suitable form of driving medium, the gins and the driving medium being provided with means whereby one or the other may be disconnected from the driving shaft when desired.

A still further object of this invention is to provide a mechanism of this character which shall include a battery of gins driven from a main driving shaft and arranged in the same horizontal plane, the driving shaft having connections with a similar shaft arranged above the plane of the first battery of gins and designed to be rendered operative or inoperative at the will of the operator independently of the operation of the first-named shaft, the second-named shaft having connections, similar to the connections of the first-named shaft, with a second battery of gins or other suitable mechanism employed in the ginning industry.

To these ends my invention comprises among other features a main driving shaft driven from a suitable source of power and provided with a novel and efficient mechanism for rendering the shaft operative and inoperative relative to the driving medium, the said main shaft having keyed thereto, at sufficient distances apart, friction disks designed to coöperate with similar disks arranged upon counter-shafts journaled in bearings and arranged at right angles to the main shaft and adapted for movement toward and from the first-named disk whereby the counter-shaft may be rendered operative or inoperative as desired, the free ends of the counter-shafts being provided with beveled friction gears adapted to frictionally engage frusto conically shaped gears arranged upon the brush and saw shafts of the gins whereby the latter may be driven and operated for the purpose for which they were intended. The bearings for the counter-shafts are mounted for sliding movement and are adapted to be manually operated to render the gins operative or inoperative as desired, the bearings to this end embodying a novel and efficient form of operating mechanism.

With the above and other objects in view the invention consists in the construction, combination and arrangement of parts hereinafter set forth in and falling within the scope of the claims, appended hereto.

Figure 4:
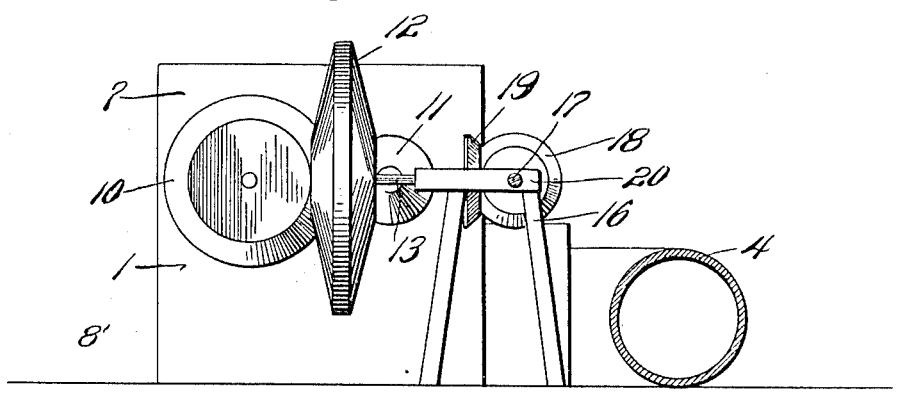

In the accompanying drawings forming a portion of this specification; Figure 1 is a side view of a battery of gins embodying the present invention. Fig. 2 is a top plan view of the same. Fig. 3 is an enlarged top plan view of a single gin embodying the present invention. Fig. 4 is an end view of Fig. 3. Fig. 5 is a central longitudinal sectional view of a gear shifter for controlling the operation of a gin. Fig. 6 is a plan view of the driving mechanism. Fig. 7 is a side elevation of the same. Fig. 8 is a detail side elevation of one of the driving gears and its shifter. Fig. 9 is a plan view of a mechanism for driving the fans employed for removing the cotton from the gin. Fig. 10 is a transverse section through a portion of a building, showing the means for transmitting power from one floor to another, and Fig. 11 is a detail of the mechanism employed in Fig. 10 for shifting the gears into and out of operation.

Similar reference characters designate corresponding parts throughout the drawings.

Referring more particularly to the accompanying drawings wherein is illustrated the preferred form of my invention, I have shown the invention applied to three gins although I desire it to be understood that any number of gins or other devices may be used. In these drawings A designates the battery embodying the gins 1, 2 and 3, each of which is provided with an outlet 4 discharging into the usual lint flue 5 provided at its discharge end with the condenser 6 from which the cotton may be discharged into any suitable device. Each of the gins comprises a suitable casing 7 mounted on suitable supports 8 and having the outlets 4 connected at their lower ends to the lint flue as is usual in gin constructions. Journaled in opposite sides of the gin casing 7 and projecting beyond one of said sides are the gin saw and brush shafts 8 and 9 respectively which are arranged in parallel relation. Fixed to the protruding ends of the shafts 8 and 9 are friction cones 10 and 11 respectively, the cone 11 being of a greater diameter than the cone 10 and fixed to the brush shaft whereby the brush may be rotated at a speed greater than the speed of the saw to facilitate the cleaning of the latter as usual. The cones 10 and 11 are spaced apart to receive a beveled friction disk 12 the opposite sides of which operatively engage the members 10 and 11 to drive the shafts 8 and 9 in the operation of the gin, and which is mounted upon one end of the counter-shaft 13 arranged in a bearing 14 mounted for sliding movement in a housing 15 supported upon a frame 16. Arranged parallel of the battery of gins and in horizontal alinement with the shafts 8 and 9 is a main driving shaft 17 provided at suitable points on its length with friction disks 18 keyed to the said shaft 17 and adapted to be frictionally engaged by similar disks 19 carried by the free end of the counter-shaft 13. The supporting frame 16 at suitable points along its length is provided with bearings 20 which receive and support the shaft 17, the frame 16 being provided with lateral projections 21 arranged at suitable distances apart along its length and adapted to receive and support the housings 15 and bearings 14 of the counter-shaft so that the main driving shaft 17 and the counter-shaft 13 may be supported in their proper relative positions.

The bearings 14 of the counter-shafts 13 are positioned within the housings 15 and adapted for sliding movement therein whereby the friction disks 19 may be moved into and out of engagement with the disks 18 to control the operation of the gin. To facilitate the sliding of each of the bearings 14 the respective housings 15 have mounted therein for sliding movement a block 22 having one of its ends engaging the bearings 14 and its opposite end beveled in a lateral direction. The block 22 is preferably of such dimensions as to snugly fit within the housing 15 and be freely slidable therein. Adjacent the beveled end of the block 22, the housing 15 is provided with an operating block 23 having one side corresponding to the inclination of the block 22 and of a width less than the similar dimension of the housing. The block 23 is adapted for movement within the housing between the side walls thereof and is provided with a centrally arranged screwthreaded aperture in which is threadedly mounted an operating rod 24 provided with a handle 25 and threaded for a portion of its length so that in the operation of the rod 24 the block 23 may be moved laterally within the housing 15, such movement of the block 23 serving to impart a sliding motion to the block 22 thence to the bearings 14 whereby the shaft 13 may be moved longitudinally of the housing to cause the members 12 and 19 to operate the gin as described. At its forward end the housing 15 is provided with an extensile spring 26 designed to engage one end of the housing and one end of the bearing 14, the said spring serving to actuate the bearing to move the gears 12 and 19 out of engagement with the gears 10, 11 and 18 respectively, upon the operating rod 24 shifting the block 23 to the opposite side of the housing 15. The housing 15 is provided at one end with elongated slots or guide ways 27 through which the shaft 13 is designed to pass, the slots serving to permit of the sliding motion of the shaft.

Adjacent one end, the shaft 17 is provided with a friction disk 28 having its peripheral edges beveled as at 29. The disk 28 is adapted to drive the fans B which may be mounted within the lint flue 5 to withdraw the lint from the bottom of the gin. The fan B is arranged in a plane below the plane of the shaft 17 and is parallel therewith being supported upon suitable framework within the flue 5. The fan shaft 30 is provided with oppositely disposed beveled disks 31 designed to engage the beveled portions 29 of the member 28. The disks 31 are mounted upon the shaft 30 for sliding movement so that the same may be brought into and move out of engagement with the disk 28 to control the operation of the fan. To this end the disks 31 are provided with centrally arranged sleeves 32 designed to encircle the shaft 30 and splined thereto for sliding movement. The numerals 33 designate what I term gear shifting levers and each comprises a web portion 34 having diametrically opposed arms radiating therefrom and provided adjacent their outer ends with threaded apertures 36. The web-portion 34 of the lever is provided with a sleeve 37 designed to receive the sleeve 32 of a disk 31 and securely locked thereto by a pin 38 carried by the said sleeve 32. The horizontal members of the supporting frame of the fan B are formed with alining openings in which is journaled the fan shaft 30 and upon opposite sides of the shaft 30 are provided similar openings 39 in which are engaged operating rods 40 provided with handles 41. Exteriorly of the horizontal bars of the supporting frame, the operating rods 40 are provided with stop nuts whereby displacement of the rods from the openings is prevented. Each rod 40 at predetermined points is provided with right and left hand threads adapted to engage the apertures 36 in the gear shifting lever 33 whereby the disks 29 may be moved in relatively opposite directions upon the shaft 17 to engage or disengage the disk 28. From the above construction it will be seen that the fan B may be connected to or disconnected from the shaft 17 at the will of the operator and independently of the operation of the gins.

At its opposite end the shaft 17 is provided with oppositely disposed beveled disks 42 similar to the disks 31 and splined to the shaft 17 for sliding movement. These disks 42 are provided with centrally arranged sleeves 43 designed to encircle the shaft 17 and receive the sleeves 44 arranged upon gear shifting levers 45, the construction of which are similar to the construction of the gear shifting levers 33 hereinbefore described with reference to the fan actuating mechanism. Each lever 45 is also provided with alining openings 46 threaded to receive operating rods 47 arranged in suitable bearings upon the framework C of the driving mechanism and provided with right and left hand threads for engagement with the openings in the levers 45 whereby the said levers may be moved relatively toward and from one another to slide the disks 42 along the shaft 17 for a purpose which will appear later.

Mounted upon the framework c of the driving mechanism and adjacent the disks 42 is an engine 49 or other suitable form of driving medium provided with a fly wheel 50 and a driving disk 51 arranged upon the crank shaft 52 thereof. The driving disk 51 is identical in construction to the disk 28, having its opposite peripheral edges beveled in relatively opposite directions and adapted for engagement with the beveled portions of the disks 42 when the latter have been operated for engagement with the disk 51 for the purpose of driving the shaft as hereinbefore described.

To transmit the power from the engine 49 from one floor to another, I have provided a mechanism disclosed in Figs. 10 and 11 of the drawings. This transmitting mechanism designated in general by the letter C comprises a friction disk 53 keyed to the shaft 17 and designed for engagement with a cone gear 54 arranged upon one end of a vertical transmission shaft 55 which latter is provided at its upper or free end with a cone gear 56 arranged above the plane of the shaft 17 and adapted to engage a friction disk 57 arranged upon a shaft 58 positioned upon the floor of the building above the plane of the shaft 17 and designed to be driven from the latter as is obvious. The shaft 55 is mounted in suitable bearings 59 arranged upon horizontal supports 60 and adapted for sliding movement upon said supports whereby the shaft 55 may be moved longitudinally of the supports 60 to bring the cones 54 and 56 into and out of engagement with the disks 53 and 57 respectively so that the operation of the shaft 58 may be controlled at will. The supports 60 are positioned upon suitable standards 61 which latter are preferably of a height equal to the distance between the adjacent floors upon which the shafts 17 and 58 are mounted.

To shift the transmitting shaft 55 longitudinally of the supports 60, the said supports have rigidly fastened thereto upon one side of the sliding bearings 59 shifter members 62 comprising substantially L-shaped plates having one arm arranged to project outwardly from the supports 60 and at right angles thereto and provided with threaded openings designed to receive manually operable screw shafts 63 adapted to engage one side of their respective bearings 59, the simultaneous operation of the shafts 63 serving to slide the bearings 59 and shaft 55 to move the latter into operative engagement with the disks 53 and 57. To disengage the shaft 55 from the disks 53 and 57, each of the supports 60 is provided with abutments 64 having a centrally arranged pin 65 around which is coiled a helical expansion spring 66 one end of which is designed to engage the abutments 64 and the opposite end to engage the adjacent side of the bearings 59 whereby upon the release of the operating shafts 63 the bearings will be slid upon the supports 60 to render the shaft 65 inoperative.

From the above description taken in connection with the accompanying drawings it will be seen that I have provided a novel and efficient form of friction drive for ginning machinery which is simple in construction, efficient and positive in operation, and when once installed would require but minimum cost of maintenance.

Having thus described my invention what

I claim and desire to secure by Letters-Patent is:

1. In a mechanism of the class described, the combination with a plurality of counter-shafts, of a driving shaft connected to all of said counter-shafts, means for driving the last-named shaft, means for disconnecting each of said counter-shafts from the driving shaft independently of one another, and means for disconnecting the driving means from the driving shaft independently of the countershafts.

2. In a mechanism of the class described, the combination with a plurality of counter-shafts, of a driving shaft common to all of said shafts, driving means for said driving shaft, said means including an engine, means for disconnecting each of the counter-shafts from the driving shaft independently of one another, and means for disconnecting the driving means from the driving shaft independently of the counter-shafts and independently of the operation of the engine.

3. A mechanism of the class described, including a drive shaft, a support for the drive shaft, means arranged upon the support for driving said shaft, a pair of spaced friction disks associated with said drive shaft and adapted to be moved longitudinally relatively to the shaft and into and out of engagement with the said driving means, means including a gear shifting lever arranged upon each disk, and means for operating the levers to move the disks in opposite directions with respect to the shaft to connect the driving shaft to the driving mechanism and to disconnect it therefrom.

4. A mechanism of the class described including a drive shaft, a counter-shaft driven from said drive shaft, means for moving said counter-shaft into and out of engagement with said driving shaft, means for driving said drive shaft including an engine, a friction disk, and a pair of spaced beveled disks adapted to be moved in relatively opposite directions to be brought into and out of engagement with the friction disk to impart motion from the engine to the drive shaft, and means for moving said movable disks.

5. In a mechanism of the class described, the combination with a plurality of counter-shafts, of a driving shaft common to all of said shafts, driving means for said driving shaft, friction disks carried by said counter-shafts and driving shaft to drive the counter-shafts from the driving shaft, means operable to move the counter-shafts bodily to disengage the disks of the counter-shafts from those of the driving shaft, and means for disconnecting the driving means from the driving shaft independently of the counter-shafts.

6. In a mechanism of the class described, a driving shaft, a plurality of counter-shafts operatively associated with the driving shaft and movable into and out of engagement therewith, means for driving said driving shaft, means for disconnecting the driving means from the driving shaft independently of the counter-shafts, and means for disconnecting the counter-shafts from the driving shafts independently of the driving means and of one another.

7. The combination with a driving motor, of a disk carried by the motor and driven therefrom, a shaft adapted to be driven from said disk, a pair of spaced disks upon said shaft and adapted to engage the opposite sides of the first-mentioned disk to impart movement to the shaft from the motor, and means for moving the last-mentioned disks longitudinally of the shaft.

8. The combination with a driving motor, of a disk carried by the motor and driven therefrom, a shaft adapted to be driven from said disk, a pair of spaced disks upon said shaft and adapted to engage the opposite sides of the first-mentioned disk to impart movement to the shaft from the motor, and means for moving the last-mentioned disks in relatively opposite directions to move the same into and out of engagement with the first disk.

9. The combination with a driving motor, of a disk secured to the driving motor and driven therefrom and having its opposite peripheral edges beveled, a shaft adapted to be driven from the motor, a pair of disks upon said shaft and having beveled peripheries adapted to engage the beveled peripheral edges of the first disk, and means for moving the last-mentioned disks into and out of engagement with the first disk.

10. The combination with a driving motor, of a disk secured to the driving motor and driven therefrom and having its opposite peripheral edges beveled, a shaft adapted to be driven from the motor, a pair of disks upon said shaft and having beveled peripheries adapted to engage the beveled peripheral edges of the first disk, and means for moving the last-mentioned disks in relatively opposite directions upon the shaft to cause the same to engage and disengage the first disk.

11. The combination with a driving motor, of a disk carried by the driving motor and rotatable therefrom, a shaft adapted to be driven from said motor, a pair of spaced disks arranged upon the shaft and capable of moving toward and away from the first-mentioned disk, gear shifting levers secured to said disks and provided with alining apertures, and operating rods threadedly engaging the apertures in said levers and operable to move the disks upon the shaft toward and away from the driving disk on the motor.

12. The combination with a driving motor, of a disk driven by said motor, a shaft, a pair of disks upon said shaft and spaced apart and adapted for movement in relatively opposite directions, and means for moving said disks to place the same in and out of driving engagement with the first disk.

In testimony whereof I affix my signature in presence of two witnesses.

THOMAS R. SMITH.

Witnesses:
G. C. CARRIGAN,
J. D. RICHBOURG.

Copies of this patent may be obtained for five cents each, by addressing the "Commissioner of Patents, Washington, D. C."